US 008793492B2

(12) United States Patent
Shah et al.

(10) Patent No.: US 8,793,492 B2
(45) Date of Patent: Jul. 29, 2014

(54) METHODS AND SYSTEMS FOR SCALABLE DISTRIBUTION OF PROTECTED CONTENT

(75) Inventors: Kunal Shah, Milpitas, CA (US); Sunil Agrawal, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 143 days.

(21) Appl. No.: 13/005,823

(22) Filed: Jan. 13, 2011

(65) Prior Publication Data

US 2012/0185695 A1 Jul. 19, 2012

(51) Int. Cl.
*G06F 21/00* (2013.01)
*H04L 29/06* (2006.01)

(52) U.S. Cl.
USPC .......... 713/168; 713/185; 726/9; 726/20; 380/281

(58) Field of Classification Search
None
See application file for complete search history.

(56) References Cited

U.S. PATENT DOCUMENTS

| | | | |
|---|---|---|---|
| 6,920,567 B1 | 7/2005 | Doherty et al. | |
| 7,313,512 B1 | 12/2007 | Traut et al. | |
| 2003/0028664 A1* | 2/2003 | Tan et al. | 709/237 |
| 2003/0221099 A1 | 11/2003 | Medvinsky et al. | |
| 2004/0172533 A1* | 9/2004 | DeMello et al. | 713/164 |
| 2005/0289072 A1 | 12/2005 | Sabharwal | |
| 2006/0212405 A1 | 9/2006 | Gordon et al. | |
| 2007/0033402 A1 | 2/2007 | Williams et al. | |
| 2007/0043680 A1 | 2/2007 | Fox et al. | |
| 2007/0175205 A1 | 8/2007 | Robel et al. | |
| 2008/0092221 A1* | 4/2008 | Tan et al. | 726/10 |
| 2009/0271319 A1 | 10/2009 | Bromley et al. | |
| 2012/0174198 A1* | 7/2012 | Gould et al. | 726/6 |

OTHER PUBLICATIONS

Adobe Systems Incorporated, "Adobe Flash Access 2.0," 7 pages, dated 2010.
Adobe Systems Incorporated, "Adobe Flash Access Overview on Protected Streaming," 5 pages, dated 2010.
Adobe Systems Incorporated, "Authenticate using a token," available at http://livedocs.adobe.com/flashmediaserver/3.0/hpdocs/help.html?content=00000115.html (last accessed Dec. 20, 2010).
Microsoft Corporation, Windows Media Personal License, available at http://www.microsoft.com/windows/windowsmedia/forpros/drm/pluwiz.aspx (last accessed Sep. 2, 2010), date unknown.
Agrawal et al., Unpublished U.S. Appl. No. 12/915,349, filed Oct. 29, 2010.

(Continued)

*Primary Examiner* — Izunna Okeke
(74) *Attorney, Agent, or Firm* — Kilpatrick Townsend & Stockton LLP

(57) ABSTRACT

A computerized device can implement a content player to access a content stream using a network interface, the content stream comprising encrypted content and an embedded license comprising a content key encrypted according to a global key accessible by the content player. The content player determines whether a token meeting an authorization condition is present and uses the global key to decrypt the content key only if such a token is present. The authorization condition may be evaluated at least in part based on data included in the content stream. The authorization condition can include presence of a token having a content ID matching a corresponding ID in the license; presence of a token with a correct device ID; presence of a token signed according to a digital signature identified in the licenses; and/or presence of a token that is unexpired, with expiration evaluated based on a time-to-live indicator in the token.

18 Claims, 4 Drawing Sheets

(56) References Cited

OTHER PUBLICATIONS

"On Demand Protected Documents," Abstract from IP.COM Database, Disclosure No. IPCOM000135959D, dated Apr. 28, 2006.

Non Final Office Action dated Jul. 19, 2012 in related U.S. Appl. No. 12/915,349, 20 pages.

Notice of Allowance in related U.S. Appl. No. 12/915,349, dated Feb. 13, 2013, 9 pages.

* cited by examiner

METHODS AND SYSTEMS FOR SCALABLE DISTRIBUTION OF PROTECTED CONTENT

BACKGROUND

Digital content distribution is extremely popular, especially streaming of content over the Internet and other networks. Most content producers desire some sort of rights management, and so content distribution systems typically use digital rights management (DRM) techniques to control use of the content. For example, a client may be required to obtain a license from a server in order to successfully access a stream of encrypted content, with the license containing a content key. Unfortunately, the use of license servers is not always ideal. In order to securely provide the license and content key to the client, the license server must not only authorize the client to use the content, but must be configured in a way that does not jeopardize the DRM of the content distribution system. Supporting such license servers or obtaining computing resources for license servers from an outside provider may be a significant logistical issue for content providers.

SUMMARY

A computerized device can implement a content player to access a content stream using a network interface, the content stream comprising encrypted content and a content key encrypted according to a global key accessible by the content player. The content player can determine whether a token meeting an authorization condition is present and use the global key to decrypt the content key only if the token meeting the authorization condition is present. The authorization condition may be evaluated at the client and based at least in part on data included in the content stream. For instance, the authorization condition(s) may be specified in the license and/or may be specified in the content stream as token parameters.

Examples of authorization conditions include presence of a token having a content ID matching a corresponding content ID in data included in the content stream; presence of a token signed according to a digital signature identified in data included in the content stream; presence of a token matching a device ID of the machine carrying out the authorization process; and/or presence of a token that is unexpired, with expiration evaluated based on a time-to-live indicator in the token.

This illustrative embodiment is discussed not to limit the present subject matter, but to provide a brief introduction. Additional embodiments include computer-readable media embodying a content player along with computer-implemented methods for accessing an encrypted content stream with an embedded license based on evaluating whether a token meets one or more authorization conditions. Additional embodiments include server-side devices, methods, and computer-readable media for distributing tokens and licenses for use by such a client. These and other embodiments are described below in the Detailed Description. Objects and advantages of the present subject matter can be determined upon review of the specification and/or practice of an embodiment configured in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
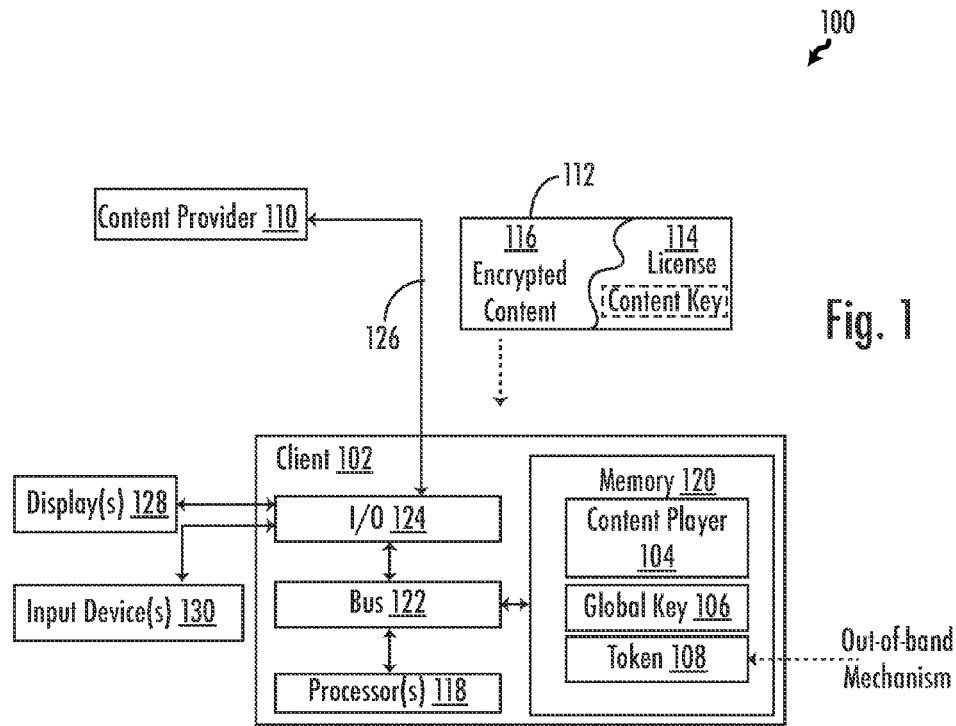
FIG. 1 is a diagram showing a content distribution system that includes one or more clients implementing a content player configured to handle content streams with embedded license data

Presently-disclosed embodiments include computing systems, methods, and computer-readable media embodying code to implement a scalable content distribution system. For example, as shown in FIG. 1 a content distribution system 100 includes one or more clients 102 implementing a content player 104. Each content player 104 includes or has access to a global key 106. One or more tokens 108 may also be present at client 102 and are obtained by client 102 using an out-of-band mechanism (i.e., obtained independently from download of content).

A content server 110 provides content stream 112, which includes an embedded license 114 with encrypted content 116. Encrypted content 116 is accessible through use of a content key comprised in license 114. The content key itself is encrypted to be accessible using global key 106. Content player 104 is configured to use global key 106 to decrypt the content key only if a token meeting one or more authorization conditions is present. If there is a token that meets the condition(s), the decrypted content key can then be used to decrypt the content.

Because the determination of whether the client is allowed to use the content occurs at player 104 (referred to as "client-side content authorization" below), the content provider can be spared the hassle of deploying infrastructure, such as license servers, that authorize the clients at the time content is consumed. Instead, the content provider need merely provide some mechanism for relaying token 108 to the client, while the content key is safely encrypted and distributed with the content itself without the need for a license workflow.

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment.

In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

As noted above, FIG. 1 is a diagram showing an example of a computing device 102. Computing device 102 may alternately be referred to as a data processing system, computerized device, or simply a "computer." Computing device 102 represents a desktop, laptop, tablet, or any other computing system, such as mobile devices (PDAs, smartphones, media players, gaming systems, etc.) or embedded systems (e.g., in vehicles, appliances, a television, or another device).

In the example shown in FIG. 1, computing device 102 features a data processing hardware element comprising one or more processors 118 and a computer-readable medium (memory 120) interconnected via internal busses 122, connections, and the like. Bus 122 also connects to I/O components 124, such as universal serial bus (USB), VGA, HDMI, or other display adapter(s), serial connectors, and/or other I/O connections to other hardware of the computing system. Additionally, I/O components 124 include one or more network interfaces to network connection(s) 126. Network connection 126 may comprise a wireline connection (e.g., internet, fiber optic, cable television) and/or wireless connection (e.g., IEEE 802.11, 802.16, Bluetooth, radio communication via GSM, CDMA, UMTS, LTE, or another wireless standard, etc.).

The hardware also includes one or more displays 128 and input devices 130 (e.g., keyboard, keypad, mouse, touch screen interface, etc.). It will be understood that computing device 102 could include other components, such as storage devices and other I/O components such as speakers, a microphone, or the like.

Computer-readable medium 120 may comprise RAM, ROM, or other memory. In this example, computer readable medium 120 embodies program logic for a content player 104 and stores data elements including global key 106 and token(s) 108. In practice, global key 106 may be integrated into content player 104. For example, the values defining global key 106 may be hard-coded into content player 104 rather than referenced as a separate file. As another example, global key 106 may be defined as a reference to a hardware element accessed by program logic of content player 104 during execution. In some implementations, global key 106 is defined during an individualization or other process carried out under the control of a party that provides or maintains content player 104. For example, content player 104 may connect to a server for an individualization process during which global key 106 is provided to content player 104.

Generally speaking, content player 104 causes computing device 102 to receive stream 112 including embedded license 114 and encrypted content 116 as noted herein. Content player 104 checks for the presence of an appropriate token 108 meeting one or more authorization conditions. If the condition(s) are met, the content player 104 causes computing device 102 to use global key 106 to decrypt the content key included in license 114 and use the decrypted content key to access encrypted content 116. Content player 104 can be implemented in software as shown in this example, or could be implemented using hardware accessible by or as part of the data processing element (e.g., as an application-specific integrated circuit, (ASIC) or programmable logic device (e.g., PLAs, FPGAs, etc.)).

Figure 2:
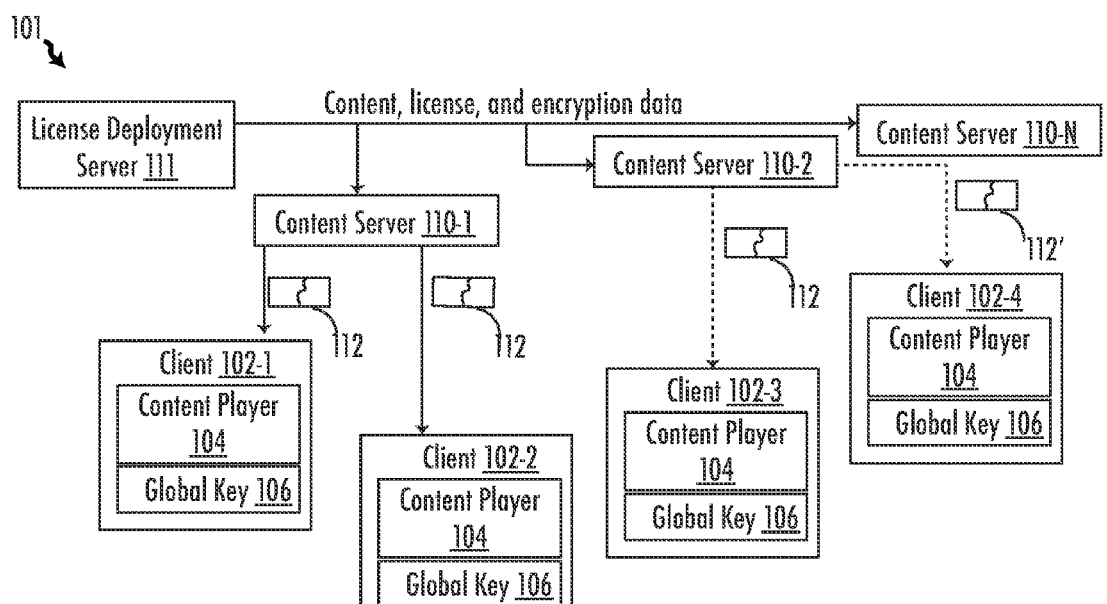
FIG. 2 is a diagram showing an example of a content distribution system scaled to service multiple clients.

Use of content player 104 can allow for a scalable system for distribution of DRM-protected content. FIG. 2 is an example of a system 101 for distributing content. As shown here, each of a plurality of clients (102-1, 102-2, 102-3, 102-4) implements an instance of content player 104, each instance having access to the same global key 106.

A content provider can use a license deployment server 111 and multiple content servers 110-1, 110-2, 110-N. As shown here, each content server 110 provides a content stream 112 based on content, license, and encryption data provided from license deployment server 111. The content, license, and encryption data may be assembled into stream 112 at servers 110 or license deployment server can generate a package comprising encrypted content and license data and deploy the package for servers 110 to stream. Depending upon the particular license parameters, an identical content stream 112 may be provided or, as shown at 112', the content streams may include embedded licenses that differ for different clients 102. For instance, the content streams may be adapted for specific client devices or specific device types or classes. Additionally, it will be understood that in practice the number of clients could number in the hundreds or thousands.

Other content provider entities may use their own content servers, or multiple different content provider entities can use the same content servers. For example, in some implementations a content provider may maintain a license deployment server 111 and then deploy protected content from server 111 to a content delivery network (CDN) for streaming to clients.

Each client 102 uses the same global key 106, subject to conditions specified in license 114 embedded in content stream 112 (112'), to access the content key. In practice, different global keys 106 could be used, such as different global keys for different devices, different classes of devices, different versions of content player 104, or for another purpose. Because content authorization is handled at clients 102, content providers need not implement a server-side license and client verification workflow as part of the streaming process. Instead, providers 110 merely provide encrypted content 116 with an embedded license 114 that includes the corresponding content key, along with data specifying the authorization conditions—either in the license or separately embedded in the content data.

This allows for a very scalable solution because the content and embedded license/authorization data can be deployed without the need to support server-side content authorization activity when the deployed content/license data is used by the client. The client can be authenticated outside the license acquisition/use process—for instance, relatively light-weight infrastructure can be used in distributing tokens used during the client-side content authorization process. In some implementations, the Flash® Media Token Authentication scheme, available from Adobe Systems Incorporated of San Jose, Calif., can be used.

Figure 3:
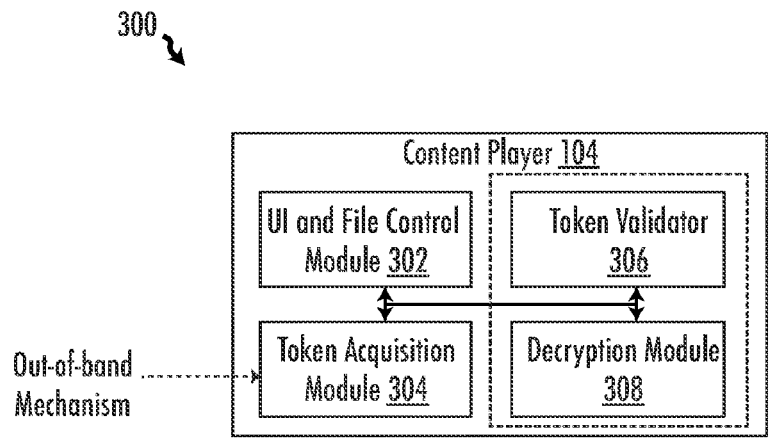
FIG. 3 is a diagram showing an exemplary architecture for a content player configured to handle content streams with embedded license data.

FIG. 3 is a diagram showing an exemplary architecture 300 for content player 104. Content player 104 may be implemented using any suitable technique. For example, in some implementations, content player 104 is implemented as an Adobe® Flash® or AIR® application. However, content player 104 could be implemented for use in another runtime environment or for execution within an operating system. As another example, content player 104 could be implemented as part of a standalone application, such as in a web browser that can access and render streamed content.

UI and file control module 302 represents program code or hardware logic for providing a user interface and providing content output. For example, module 302 may provide a window or other interface and render audio, video, and/or audiovisual content as appropriate using one or more codecs. Module 302 may further open an appropriate network connection and retrieve content stream 112 using a suitable streaming technique, such as by a dynamic HTTP streaming connection. As a particular example, the real-time messaging protocol (RTMP) protocol provided by Adobe Systems Incorporated of San Jose, Calif., can be used. Module 302 may also pass license 114 and content 116 to the components responsible for analyzing the data indicating the authorization conditions and for decrypting the content.

Token acquisition module 304 represents code or logic by which content player 104 obtains token(s) 108 for use in accessing protected content. A client 102 can actually acquire token(s) 108 in any suitable manner via an out-of-band mechanism. The "out-of-band mechanism" is meant to refer to a data processing workflow or session separate from accessing stream 112. The token(s) may be obtained using the same network hardware used to obtain the content, of course.

Generation of tokens is much lighter weight (i.e., uses less complex computing infrastructure) as compared to issuance of licenses. As mentioned earlier, it will typically not require any special hardware or server set up and can be easily incorporated into existing infrastructure such as that of the user authentication server.

Put another way, in some implementations content player 104 is configured to access stream 112 without negotiating with a server for rights to the content. Content player 104 can engage in any required workflow to gain rights to the server (e.g., routine handshaking, general server login (if required)), but the stream is simply provided to content player 104 without further authorization checks for rights to the streamed content. Instead, the content distribution system relies on client-side content authorization via token(s) 108, which pave the way for content player 104 to use the license and global key 106. Token(s) 108 may be obtained at any time, including in advance of accessing stream 112 or just before accessing stream 112.

The workflow for obtaining the tokens can be handled by a token acquisition component of client 102 included in player 104 or implemented as a separate component (e.g., a web browser or messaging program). For example, the client may visit a web site or service associated with content provider 110 and obtain one or more tokens 108 after logging in, paying a fee, etc. The web site or service may then redirect the client to a URL/URI to access the corresponding stream 112. As other examples, the token(s) 108 could be provided along with player 104, could be distributed using hardware, or could be received by client device 102 over network 126 in some other way. Note that token 108 is a data element, not a license, and is not in and of itself usable to decrypt protected content such as the encrypted content key or the encrypted content itself.

As shown here, content player 104 also includes token validator module 306 and decryption module 308. These modules are shown in a dashed box to indicate that at least the program code/hardware logic corresponding to these modules is implemented in a way that is secure. For example, any suitable techniques can be used to harden content player 104 to avoid a hostile party gaining access to global key 106 or altering the logic of content player 104 to gain access to protected content even when conditions for accessing that content have not been met.

Generally speaking, validator module 306 determines whether a token meeting the authorization condition(s) is present, while decryption module 308 handles the details of decrypting the content key and then the encrypted content. The token may be "present" only if the token is located at an expected location, such as a storage location defined by player 104. For example, tokens may be stored in a secure store or may otherwise be protected to avoid tampering.

Figure 4:
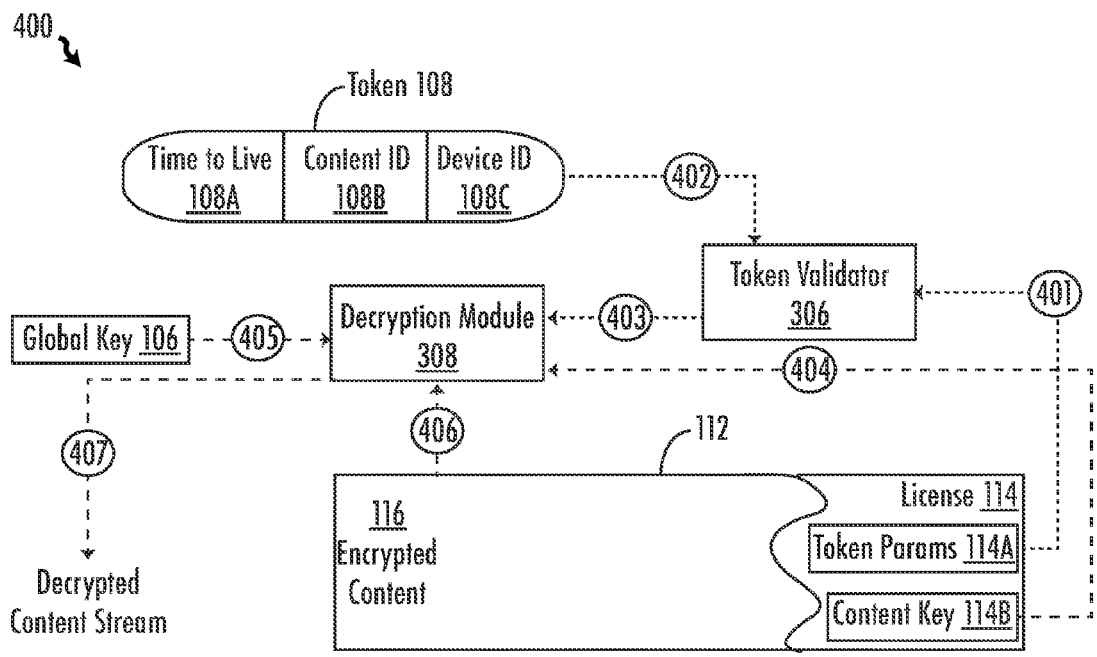
FIG. 4 shows an example program flow carried out by a content player in handling a stream with embedded license data based on validating a token.

An example of operating of token validator module 306 and decryption module 308 of FIG. 3 will be discussed below along with FIG. 4, which shows an example program flow 400 carried out by content player 104. Initially, UI module 302 obtains content stream 112 from a suitable resource (e.g., via an internet connection to a server hosting content from content provider 110 of FIG. 1) and makes the stream available to the other components of content player 104, including token validator module 306. Token validator module 306 comprises code or hardware logic for identifying data that specifies authorization conditions that must be met in order for content player 104 to carry out the decryption process.

In this example, the conditions are indicated as token parameters 114A, and in flow 400, the step of identifying the authorization conditions is shown at 401. In this example, the parameters 114A direct token validator 306 to locate and validate a token 108 as shown at 402. Although token parameters 114A are shown in this example as part of the embedded license, they may be located elsewhere in the content stream.

In this example, token 108 includes a time to live indicator 108A, content ID 108B, and device ID 108C. The first authorization condition of this example is whether token 108 is validly signed, and so token validator module 306 first checks to determine if token 108 is valid. For example, parameters 114A may identify a digital signature that must be matched by token 108—if token 108 is not properly signed, then token 108 will be considered invalid.

The second authorization condition of this example is whether the token is expired. For example, the time to live indicator 108A may simply identify an expiration date/time, and so this authorization condition is checked by evaluating the indicator without reference to a parameter included in the embedded license. Alternatively, token validator module 306 can check to determine whether a time/date specified as a parameter in the license has passed, or whether the time to live indicator is within a threshold time period specified in the embedded license.

The third authorization condition in this example is whether the token is for the particular content in stream 112. For instance, content ID 108B can be checked to determine if it matches a corresponding content ID included in license parameters 114A.

This example also illustrates a fourth authorization condition that is evaluated based on determining whether a device ID 108C included in token 108 matches a device ID of client 102. In some implementations, parameters 114A can include a condition indicating that client 102 must have a token 108 matching a device ID of client 102; however, verification of the device ID may occur by default, without a need for parameters 114A to specify that the device ID matching process is to be carried out. Checking for a device ID or other suitable identifier can prevent authorization from being carried out at an improper client based on a token 108 copied or stolen from a proper client.

To support validation of the device ID, the content provider can implement a token distribution system that provides token 108 in response to a request from a client 102. The token can be generated in a way so that the token is tied to the client 102 based on a device ID included in the request and/or based on other information (e.g., hardware details) included in the request and used by the content provider to generate a unique device ID.

Not all content providers may choose to bind a token to a specific device, and so it will be understood that the device ID 108C is shown for purposes of example and not limitation. In addition to or instead of a device ID binding, a binding to a particular content player 104 instance or version could be used as well.

If token 108 is valid, token validator module 306 provides a command as shown at 403 to decryption module 308 which, as shown at 404 obtains content key 114B included in embedded license 114. As noted above, the content key is encrypted according to global key 106. Thus, as shown at 405, decryption module 308 uses global key 106 to decrypt content key 114B. Then, as shown at 406 and 407, encrypted content 116 can be accessed, decrypted using content key 114B, and output as a decrypted content stream. For example, the content stream can be provided to UI and file control module 302 to output audio, visual, or audiovisual content.

In this example, UI and File Control Module 302 was discussed in terms of playing back audio, visual, or audiovisual content. The content may be played back directly at the device implementing content player 104 (e.g., using display 128 of FIG. 1 and audio output components) or the content could be relayed by module 302 to another device for actual output. Additionally, the principles discussed herein could be applied to access of other protected content distributed as a stream including a license. For example, content of a game or other application may be provided in a streaming format along with an embedded license setting conditions for use in by player 104.

Figure 5:
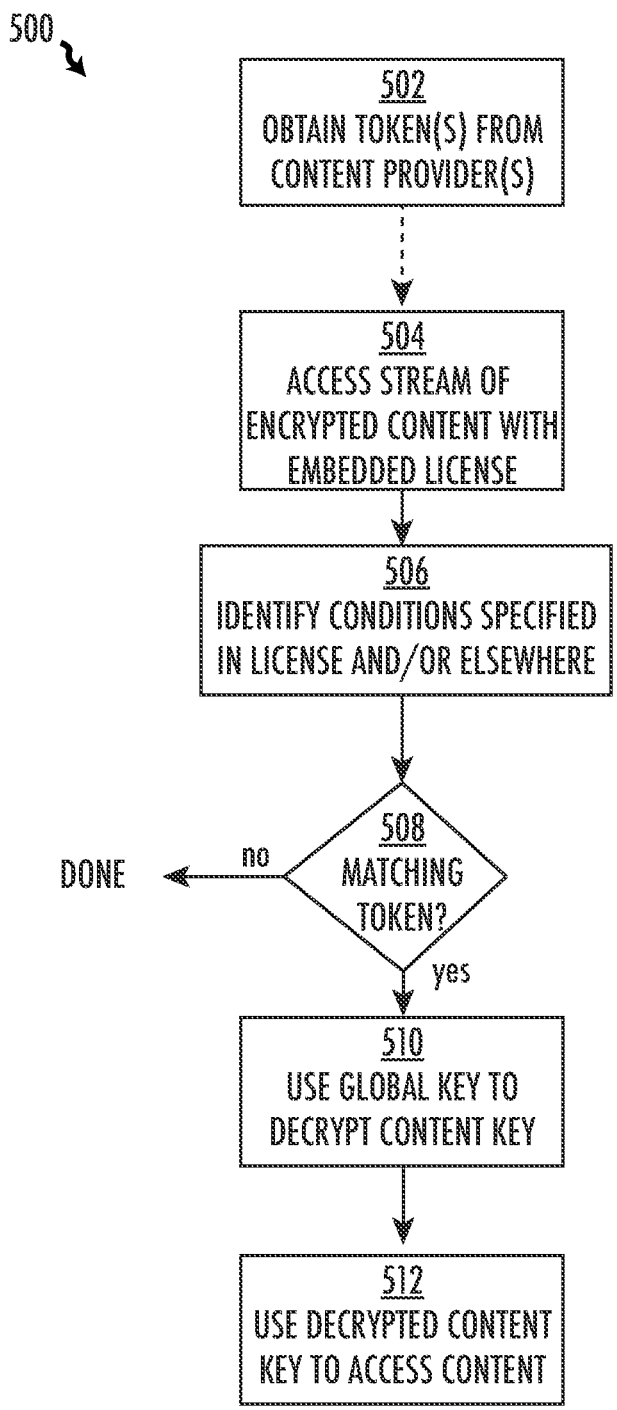
FIG. 5 is a flowchart showing an illustrative computerized method for handling a content stream.

FIG. 5 is a flowchart showing steps in an exemplary processing method 500 carried out by a client such as client 102 implementing a content player 104. Block 502 represents obtaining one or more tokens from a content provider or multiple content providers. As was noted above, the token(s) may be obtained using an out-of-band mechanism, i.e., though a transaction or workflow separate from the transaction or workflow of receiving content. For example, a web browser or other application can be used to obtain one or more tokens from a licensing server or other secure device operated on behalf of a content provider. For instance, an end user may visit a web page or other resource to download the token or tokens after a suitable authentication process, payment, etc., with the web page or other resource redirecting the end user's device to an appropriate resource (e.g., content server) for carrying out the transaction/workflow for receiving the content.

Additionally or alternatively, the token or tokens can be obtained entirely independently from accessing content. For example, the tokens may be obtained when a content player 104 is downloaded or otherwise obtained. Because block 502 may be carried out separately from accessing a stream of protected content, it is connected by a dashed line to block 504—accordingly, it should be clear that in practice method 500 could begin at block 504 on the assumption that token(s) have been obtained.

Block 504 represents accessing a stream of encrypted content featuring an embedded license. For example, a player 104 may submit a request to an appropriate network resource (e.g., streaming server 110) and retrieve the stream using the RTMP protocol noted above or another streaming protocol. At block 506, the method identifies the authorization conditions that must be met. For example, this may entail identifying one or more parameters included in the embedded license or elsewhere in the content stream.

The license may, for example, be embedded in a particular portion of the stream (e.g., in a header for the entire stream) or may be interspersed in various portions of the stream. The embedded license can be obtained by monitoring the stream and extracting the license data once the header or other portion(s) have arrived. As a particular example, the stream may initially include basic headers and handshaking data followed by one or more objects once a connection is established. The object(s) can contain the embedded license and then can be followed by one or more objects including the encrypted content data. The actual license parameters can be identified based on an expected file structure or syntax.

Block 508 represents checking whether the client has a token that matches the parameters specified in the embedded license and/or otherwise meets the authorization conditions for accessing the content. As shown in FIG. 5, if there is no matching token, then the method is complete.

As an example, the matching process may comprise determining whether a token stored locally at content player 104 meets some or all of the following criteria:

1. The token is signed with a digital signature specified in the token parameters and/or
2. The token includes a device ID matching the device ID of the computing device implementing content player 104; and/or
3. The token includes a content ID specified in the embedded license.

In addition to or instead of the criteria noted above, block 508 may represent checking one or more conditions that are not specified in the license parameters or elsewhere in the content stream. For instance, content player 104 may be configured to check a time to live indicator of a token to ensure that the token is not expired. Even if there is a token with the correct signature and matching the other parameters, the token will not match if it is expired.

Blocks 510 and 512 are carried out if a matching token is located at block 508. Block 510 represents using the global key included in client 104 to decrypt the content key included in the embedded license. Then, the decrypted content key is used to access the encrypted content from the content stream. The details of decrypting content should be understood by one of skill in the art. It will be understood that any suitable key technology may be used, and that when blocks 508, 510, and 512 are carried out, care should be taken to avoid unauthorized access to unencrypted content/unencrypted keys and to prevent a hacker from subverting the token validation process.

Figure 6:
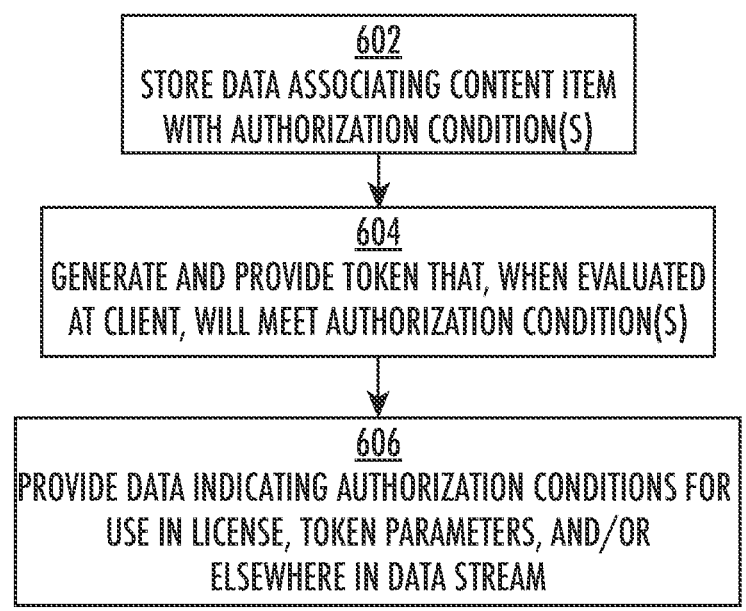
FIG. 6 is a flowchart showing an illustrative method carried out by a content provider.

FIG. 6 is a flowchart showing steps in an illustrative method 600 carried out by a content provider. For example, the method may be carried out using one or more computerized devices, such as license deployment server 111 such as shown in FIG. 2. In the following example, the license deployment server is discussed as a single entity, but it will be understood that the functionality could be distributed across multiple computerized devices.

Block 602 represents storing data, in a computerized device, associating a content item with at least one authorization condition. For example, one or more of the authorization conditions noted above can be selected, such as a requirement that a token match a device ID, a content ID, a digital signature, and/or meet an expiration condition (e.g., be unexpired when considered at the player).

Block 604 represents providing a token to a content player (e.g., content player 104), the token including data to meet the authorization condition or conditions when evaluated at the client device. For example, the token can be downloaded to a requesting client via a network connection. As another example, the token can be stored to a hardware device or computer-readable medium that is relayed to the client using an offline mechanism.

The data can be that data which, when evaluated by the client, will meet the authorization condition. For example, the token can include at least one of the content ID, a time-to-live indicator, and/or a device ID based on information provided in a request from the content player. Additionally, the token can be digitally signed according to a signature associated with the content provider.

Block 606 represents providing data specifying (to the extent necessary) the one or more authorization conditions to be included in the content stream which will also comprise an encrypted version of the content item. For instance, the conditions may be specified in the license that is to be embedded in the content stream. As another example, conditions can be specified in token parameters to be included elsewhere in the content stream, such as in a content header object. For example, the conditions may include data identifying the required digital signature, the content ID, and/or a required value of the time-to-live indicator.

As noted previously, some authorization conditions (e.g., presence of an unexpired token, presence of a token with a device ID that matches the device ID of the client carrying out the authorization process) may be evaluated directly by the content player. However, to the extent those features are not enabled by default, the license/authorization conditions can include data to trigger client-side evaluation of those conditions as desired by the content provider.

In some implementations, a content provider uses a computing device to distribute tokens only to proper clients. Thus, before the token is provided to the content player at a client, a suitable authentication process can be carried out to ensure the client and/or content player's identity. If payment is required, payment details can be handled during this authentication process as well.

The data defining the license and authorization conditions can be provided to a separate computing process that handles the actual streaming of the content to content players that will access the stream. Typically (though not necessarily) the separate process can be provided by a computerized device (e.g., content server 110) separate from the device that distributes tokens and specifies the authorization parameters for the tokens.

License deployment server 111 may handle the details of encrypting the content item according to a content key and encrypting the content key according to a global key or may rely on a service provider for such tasks. For example, a third-party provider may distribute content player 104 to a plurality of clients 102 and maintain data regarding global key 106 in a secure fashion. The content provider can encrypt the content item according to a content key and rely on the third-party provider to encrypt the content key in a way to be accessible by the instances of content player 104.

Additionally or alternatively, the content provider may rely on a separate entity to maintain content servers 110 and distribute the content stream. For example, the content provider can relay the data for generating content stream 112 to a content delivery network (CDN) for wide distribution using suitable hardware. However, the CDN does not need to be engaged to support an authorization routine specific to the content, and the content provider does not need to support content authorization as part of the content distribution workflow, either.

Global key 106 may be accessible across numerous devices, such as across all instances of a particular content player 104. Content player 104 can be sufficiently hardened to reduce accessibility of global key 106, to reduce accessibility of unencrypted versions of the content key from an embedded license, and to prevent a hacker from bypassing the token validation logic. For example, measures can be taken to avoid decompiling/debugging operations that could reveal data usable to obtain unprotected versions of global key 106, the content key, and flags/variables used during validation. However, even in the event of a breach, the content distribution system can adapt.

For example, after a breach occurs, the content provider can simply change to distributing content encrypted using a new content key (if the content key has been made available) and/or encrypt the content key using a new global key 106 pushed to content players 104.

Several examples of authorization conditions were noted above, but these are not intended to be limiting. For example, any suitable condition can be specified for evaluation by content player 104 either natively or by reference to an authorization condition set forth in the license parameters or included elsewhere in the content stream.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

A computing device may access one or more non-transitory computer-readable media that embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, mobile devices (e.g., tablets, smartphones, personal digital assistants (PDAs), etc.) televisions, television set-top boxes, portable music players, and consumer electronic devices such as cameras, camcorders, and mobile devices. Computing devices may be integrated into other devices, e.g. "smart" appliances, automobiles, kiosks, and the like.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A computerized device, comprising:
a network interface; and
a data processing hardware element,
wherein the data processing hardware element is configured to implement a content player, wherein the content player is configured to obtain a parameter value from a content stream accessed by the content player via the network interface, the content stream comprising encrypted content requested by the content player and an embedded license, the embedded license comprising a content key that is useable for decrypting the encrypted content and that is encrypted according to a global key accessible by the content player, the parameter value specifying a digital signature,
wherein the content player is configured to:
obtain an electronic token based on performing an authentication process for authenticating a client associated with the computerized device;
access the content stream without performing the authentication process;
determine that the electronic token is present and is signed with the digital signature specified by the parameter value obtained from the content stream, and
use the global key to decrypt the content key based on determining that the electronic token signed with the specified digital signature is present.

2. The computerized device of claim 1, wherein the content player is further configured to use the global key to decrypt the content key based on at least one of determining that the electronic token includes a device ID matching the device ID of the computerized device and evaluating a time-to-live indicator included in the electronic token to determine that the electronic token is not expired.

3. The computerized device of claim 1, wherein the content player is further configured to use the global key to decrypt the content key based on:
determining that the electronic token includes a device ID matching a device ID of the computerized device; and
evaluating a time-to-live indicator included in the electronic token to determine that the electronic token is not expired.

4. The computerized device of claim 1, wherein the data processing hardware element further comprises a token acquisition component configured to obtain the electronic token separately from accessing the content stream.

5. The computerized device of claim 1, wherein the data processing hardware element comprises a processor and the content player comprises a program component embodied in a memory device accessible by the processor.

6. The computerized device of claim 1, wherein the content player is further configured to use the decrypted content key to decrypt the encrypted content and provide output based on the decrypted content.

7. The computerized device of claim 1, wherein the global key is identical to a global key accessible by a plurality of instances of the content player, each instance of the content player implemented at a different computerized device.

8. A computer-implemented method, comprising:
associating a content item with a parameter value associated with an electronic token, the parameter value specifying a digital signature used to sign the token;
providing the electronic token to a content player application executed at a client device via a network connection based on performing an authentication process for authenticating a client associated with the client device, the electronic token comprising electronic content signed with the digital signature specified by the parameter value; and
responsive to receiving a request for the content item from the client device:
embedding data specifying the parameter value in a content stream comprising an encrypted version of the content item, and
providing the content stream to the client device, the content stream including the encrypted version of the content item and the embedded data specifying the parameter value wherein the content stream is provided to the client device without performing the authentication process in response to the request for the content item.

9. A computer program product comprising a non-transitory computer readable medium embodying program code, the program code comprising:
program code for obtaining an electronic token based on performing an authentication process for authenticating a client associated with a computing device;
program code for accessing a content stream using a network interface of the computing device without performing the authentication process, the content stream comprising encrypted content requested by a content player, a parameter value specifying a digital signature, and an embedded license that includes a content key that is useable for decrypting the encrypted content and that is encrypted according to a global key;

program code for identifying the digital signature from the parameter value in the content stream comprising the encrypted content requested by the content player;

program code for determining that the electronic token is present on the computing device and that the electronic token is signed with the digital signature specified by the parameter value; and program code for using the global key to decrypt the content key based on determining that the electronic token is present and is signed with the digital signature specified by the parameter value.

10. The computer program product of claim 9, further comprising program code for determining that the electronic token includes a device ID matching the device ID of the computing device and using the global key to decrypt the content key based on the device ID included in the electronic token matching the device ID of the computing device.

11. The computer program product of claim 9, further comprising program code for evaluating a time-to-live indicator included in the electronic token to determine that the electronic token is unexpired and using the global key to decrypt the content key based on determining that the electronic token is unexpired.

12. The computer program product of claim 9, further comprising:
program code for requesting the electronic token from a first computing system using an out-of-band mechanism separate from accessing of the content stream.

13. The computer program product of claim 9,
wherein the program code for accessing comprises code for establishing a connection to a content server and obtaining the content stream without carrying out an authorization routine specific to the content.

14. The method of claim 8, further comprising providing the electronic token with the content player application in response to a request to download the content player application.

15. A method comprising:
obtaining an electronic token based on performing an authentication process for authenticating a client associated with a computing device;

accessing a content stream using a network interface of the computing device without performing the authentication process, the content stream comprising encrypted content requested by a content player, a parameter value specifying a digital signature, and an embedded license that includes a content key encrypted according to a global key;

identifying the digital signature from the parameter value in the content stream comprising the encrypted content requested by the content player;

determining that the electronic token is present on the computing device and that the electronic token is signed with the digital signature specified by the parameter value; and using the global key to decrypt the content key based on determining that the electronic token is present and is signed with the digital signature specified by the parameter value.

16. The method of claim 15, further comprising:
determining that the electronic token includes a device ID matching the device ID of the computing device; and using the global key to decrypt the content key based on the device ID included in the electronic token matching the device ID of the computing device.

17. The method of claim 15, further comprising:
evaluating a time-to-live indicator included in the electronic token to determine that the electronic token is unexpired; and using the global key to decrypt the content key based on determining that the electronic token is unexpired.

18. The method of claim 15, further comprising requesting the electronic token from a first computing system using an out-of-band mechanism separate from the accessing of the content stream.

* * * * *